United States Patent [19]

Inamura

[11] 4,125,092
[45] Nov. 14, 1978

[54] WATER INDUCTION SYSTEM FOR INTERNAL COMBUSTION ENGINES

[76] Inventor: Toshio Inamura, 1740 Kenneth Way, Pasadena, Calif. 91103

[21] Appl. No.: 786,109

[22] Filed: Apr. 11, 1977

[51] Int. Cl.$^2$ .............................................. F02D 19/00
[52] U.S. Cl. ................................. 123/25 B; 123/25 L
[58] Field of Search ................ 123/25 B, 25 D, 25 L, 123/25 R, 25 P

[56] References Cited

U.S. PATENT DOCUMENTS

| | | | |
|---|---|---|---|
| 1,312,948 | 8/1919 | Bushey | 123/25 L X |
| 1,677,609 | 7/1928 | Abel | 123/25 B |
| 1,730,089 | 10/1929 | Nimpick et al. | 123/25 B |
| 1,918,898 | 7/1933 | Couyeow | 123/25 B |
| 2,112,972 | 4/1938 | Niethamen | 123/25 B |
| 2,441,301 | 5/1948 | Waag et al. | 123/25 L X |
| 2,444,670 | 7/1948 | Porter | 123/25 B |
| 2,611,345 | 9/1952 | Sudmeier | 123/25 R |
| 3,141,447 | 7/1964 | Jernigan | 123/25 B |

Primary Examiner—Ira S. Lazarus
Attorney, Agent, or Firm—M. Wayne Western

[57] ABSTRACT

A water induction system for internal combustion engines which consists of a metering device for metering controlled amounts of air and water, a control valve which is vacuum operated and connected to the metering device to allow a predetermined amount of air and water to be drawn into a heater wherein the air water mixture is vaporized and admixed with the fuel air mixture entering the intake manifold.

10 Claims, 10 Drawing Figures

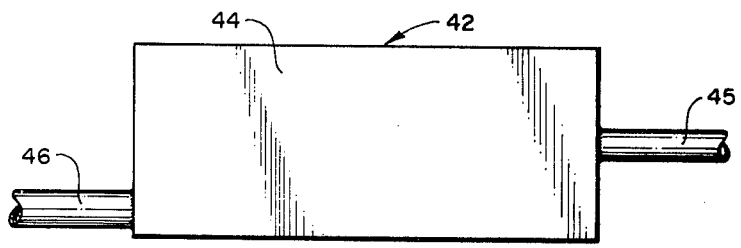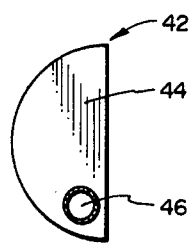
FIG. 7   FIG. 8
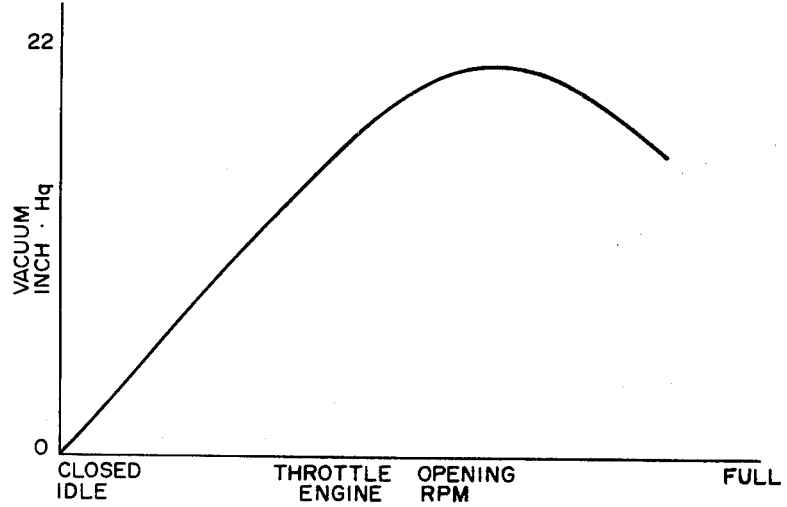
FIG. 9
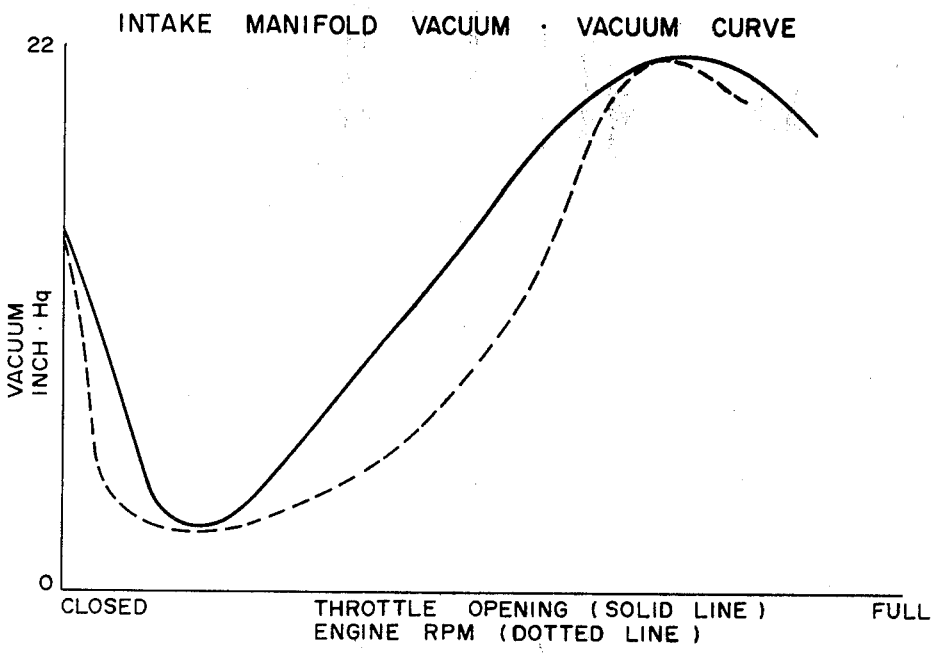
FIG. 10

WATER INDUCTION SYSTEM FOR INTERNAL COMBUSTION ENGINES

BACKGROUND OF THE INVENTION

This invention relates to an air-water induction system for internal combustion engines. More particularly this invention relates to a system for admixing air and water and passing said air-water mixture in a vaporized condition into the air fuel mixture entering the intake manifold.

It has long been known that the introduction of water, preferably in vapor form, into the air fuel mixture of an internal combustion engine possesses many advantages especially when the engine is accelerating. In other words when the throttle opening is increased the demand for water injection will be increased to meet maximum performance.

Many of the advantages of using a water induction system have been set forth in patents such as U.S. Pat. No. 1,561,693; U.S. Pat. No. 1,686,470; U.S. Pat. No. 1,783,746; U.S. Pat. No. 2,112,972; U.S. Pat. No. 2,444,628; U.S. Pat. No. 3,141,447; U.S. Pat. No. 3,665,897 and especially U.S. Pat. No. 2,444,670.

The advantages attributed to the introduction of water vapor into the air fuel mixture include more complete combustion of the fuel, less pollution, less carbon formation in the cylinder, the suppression of detonation, a reduction in internal temperatures of the cylinder heads, rings, valves and the like, the use of lower octane fuels and an increase in engine horsepower.

However many disadvantages are also attendant to these prior art systems. Often the flow of water is not regulated resulting in too little or too much water in the fuel. In many cases the size of the water droplets fed into the engine are too large to be effectively intermixed with the fuel and evenly fed to the cylinders by the intake manifold. Of those patents which regulate the flow of water vapor by vacuum the rate of flow seems to be dicatated by the intake manifold vacuum. However this is not a true measure of the engine's need for water supply. When the engine is accelerating or the throttle is wide open the intake manifold vacuum may be low allowing more air and fuel to be fed to the engine but lessening the water vapor fed at the time of maximum need.

OBJECTS AND SUMMARY OF THE INVENTION

It is an object of the present invention to provide a system wherein required amounts of vaporized water or steam can be fed into an internal combustion engine in proper proportions.

It is also an object of the present invention to provide a water injection system for internal combustion engines wherein water and air are first metered together in a metering assembly.

Another object of the present invention is to provide a water injection system wherein a metered supply of air and water are fed into a vacuum actuated control valve which controls the amount of air and water fed to an exhaust heat exchange heater in response to the water requirements of the engine.

A still further object of the present invention is to provide a vacuum controlled valve which feeds controlled amounts of air and water to an exhaust heater wherein the water is flashed into a vapor state and the air water mixture fed into the engine via the intake manifold along with the air fuel mixture from the carburetor.

These and other objects may be accomplished by means of a system consisting of a water supply reservoir and an air tube coming from the air filter wherein the air and water are fed through small orifices into a metering device from which they are subsequently fed to a vacuum operated control valve. The vacuum actuated control valve exerts zero vacuum on the metering orifice assembly when the engine is idling but is designed to provide maximum flow of air and water at the time of greatest need such as start up, climbing up a hill or accelerating. The air-water mixture passing through the control valve pass to an exhaust heat exchange heater where the water is almost instantaneously vaporized and the combined air vapor mixture is fed into the engine along with air fuel mixture from the carburetor. The point at which the air-vapor mixture enters the fuel system is below the throttle and no later than the point the air fuel mixture enters the intake manifold. Various modifications may be made in the vacuum control source and metering device without departing from the scope of this invention. The various parts of the invention are all integrated into an operative system as will be hereinafter described in detail.

DRAWINGS OF THE INVENTION

FIG. 7 is a side view of an exhaust manifold heater.

FIG. 8 is an end view of the exhaust manifold heater shown in FIG. 6.

FIG. 9 is a graphic representation of the vacuum developed in a vacuum spark advance tube at various throttle openings.

FIG. 10 is a graphic representation of the intake manifold vacuum as compared with the RPM of a typical internal combustion engine at various throttle openings.

DETAILED DESCRIPTION OF THE INVENTION

Figure 1:
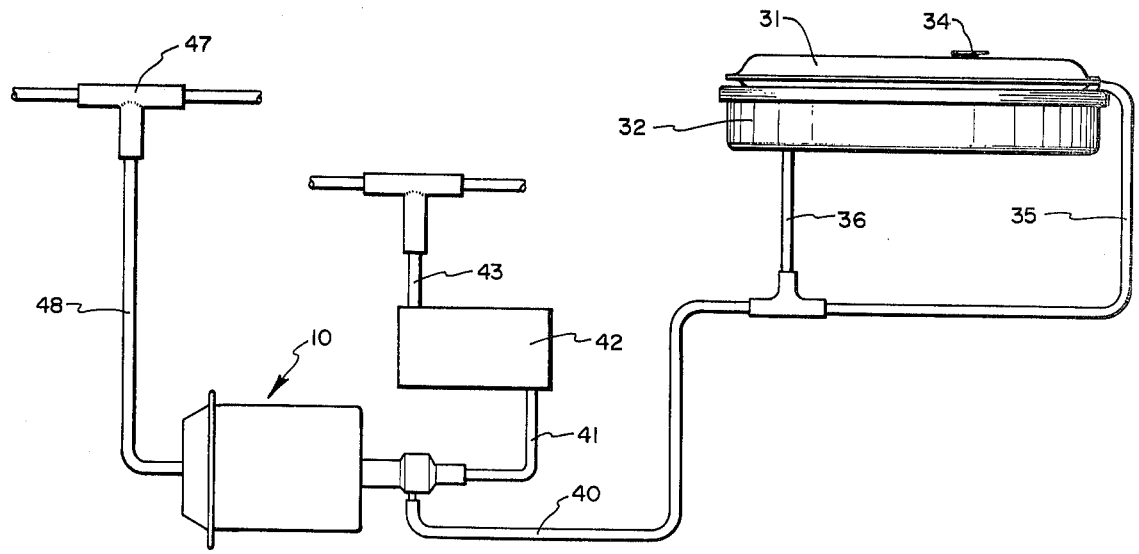
FIG. 1 is a schematic representation of one operative embodiment of the invention.

There is shown in FIG. 1 a complete schematic diagram of the present invention. As supplemented and detailed by FIGS. 2 to 10 incorporating the metering device of FIG. 3. For purposes of this description the vacuum source for operation of the control valve will be the vacuum spark advance tube leading to the distributor as found on late model cars. However, other vacuum sources such as exhaust gas recirculation (EGR) could also be used. Any vacuum line taken from the carburetor above the throttle that provides zero vacuum to the control valve at idle engine speeds can be adapted to the present invention on later model cars. However, on older cars the distributor vacuum line is not ahead of the throttle but after the throttle. Therefore this line will show a vacuum. This line can be used to actuate the control valve and will work perfectly well. However a modified valve needle is required as shown in FIG. 6.

Figure 6:
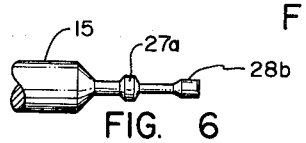
FIG. 6 is a cross section view of a symmetrical control valve needle used in older model cars.

In operation this needle operates on both sides of a null point (idle condition zero flow), when the engine is idling the needle as shown in FIG. 6 is drawn forward against spring pressure (not shown, but illustrated as spring 21 in FIG. 4) until idle land 27a is under aperture 26 and blocks flow. When accelerating, intake manifold vacuum decreases and the needle 15 is forced back by spring pressure 21 allowing maximum flow.

As the engine approaches cruise the intake manifold vacuum increases and needle 15 moves forward. It will go through land 27a and operate in the cruise range. On deceleration (throttle closed) the intake manifold vacuum goes much higher and the needle is pulled by the vacuum diaphram 13 further forward to a second null or valve tail position 28b after going through idle land 27a and shuts out any flow of water and air. However, this time span is very minimal having little effect on the over all operation. But in either event no water is supplied to the fuel system at idle engine conditions.

The system and apparatus as subsequently described revolves around operation of the control valve which is the center of operation of the system.

Figure 4:
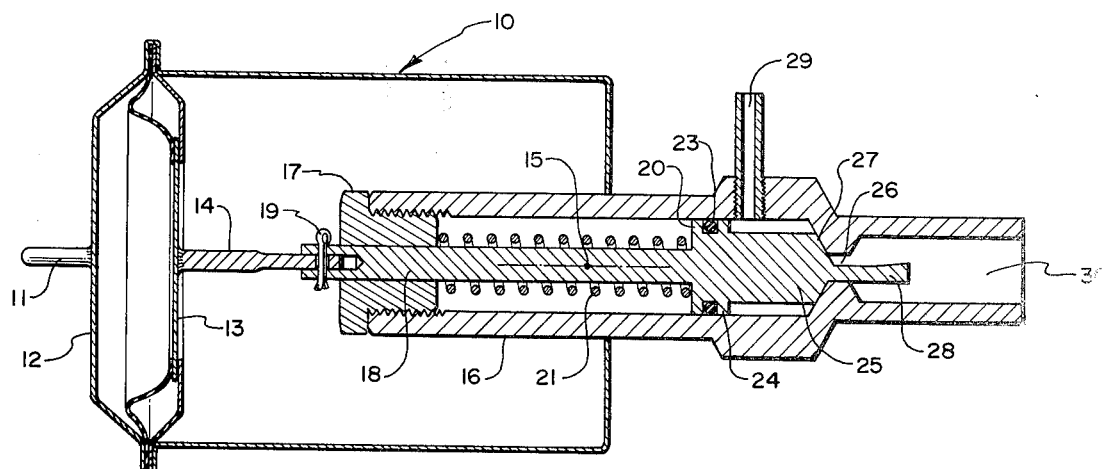
FIG. 4 is a cross sectional view of a control valve.
Figure 5:
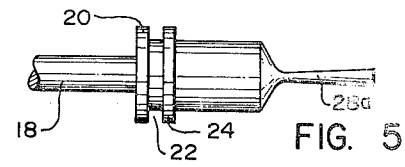
FIG. 5 is a cross sectional view of a symmetrical control valve needle.

The control valve 10 as shown in FIG. 4 consists of a vacuum diaphragm assembly containing an attachment part 11 integral with a solid wall 12 to which is attached a movable diaphragm 13. Attached to diaphragm 13 is backwardly extending rod 14. The valve control needle 15 is mounted in housing 16. Housing 16 contains a nut 17 having an aperture therein and threaded into the end of housing 16 nearest the diaphragm. Nut 17 is adjustable and therefore serves to regulate the tension of spring 21 as hereinafter described. The needle valve 15 has an elongated neck 18. The neck 18 terminates at its outer end by protruding through the aperture in nut 17 and is connected to diaphragm rod 14 by means of a pin 19 or other appropriate means. At the inner neck a shoulder 20 flares outwardly at right angles to a diameter essentially the same as the inner diameter of the housing. Interposed between nut 17 and shoulder 20 is a spring 21, which operates to keep valve needle 15 closed in the absence of applied vacuum. Shoulder 20 actually forms a flange or rim which turns inwardly, then lengthwise and outwardly to the housing diameter thereby forming an indentation or groove 22 into which is seated an O ring 23 in fluid tight relationship with the inner housing wall. A second flange or rim 24 terminates in a valve body 25 which is decreased in diameter from the flange 24. The valve housing in the area of the O ring and valve body is thickened and slants backwardly at the rear portion to form a relatively narrow aperture 26. The valve body is similarly slanted or angled at the end portion 27 to engage or seat with the angled valve housing in a fluid tight relationship. The valve body contains a valve tail 28 which as shown in FIG. 4 is assymetrically formed angling outwardly for a portion of its circumference and having a portion of its circumference in contact with the wall of aperture 26. Another configuration is shown in FIG. 5 wherein tail 28a is symmetrical and conical in shape and would be centered in aperture 26. The control valve is completed by an entry port 29 for the air water mixture and an exit port 30 into which valve tail 28 extends.

In operation vacuum applied at attachment port 11 to diaphragm 13 causes diaphragm 13 to move forward with sufficient force to overcome the tension of spring 21. The tension placed on spring 21 may be regulated by loosening or tightening nut 17. It is to be noted that in a partially open position of valve control needle 15 allows maximum air water flow through aperture 26. In the closed position no flow is allowed and in a fully open position the flow is restricted by the expanded end of valve tail 28 or 28a blocking aperture 26.

For use on older cars where the distributor vacuum line is influenced by the intake manifold the needle configuration would be as in FIG. 6. In operation under these conditions vacuum applied at attachment port 11 to diaphragm 13 causes the diaphragm 13 to move forward with sufficient force to overcome the tension of spring 21 and coming to rest where the idle land 27a of the needle is within the aperture 26. This blocks the flow of air and water mixture at idle conditions. When the throttle is opened such as during acceleration on high power demand on the engine the intake manifold vacuum decrease allowing the needle 15 under spring force to move back thus permitting the flow of air and water mixture. As the engine speeds up and the intake manifold vacuum increases the needle under the force of the diaphragm assembly moves forward through the zero flow position to a cruise position where the flow is restricted by valve tail 28b. Under deceleration (throttle closed) the intake manifold vacuum increases moving the needle to a full forward position and in which position the flow of air and water mixture is stopped.

Figure 2:
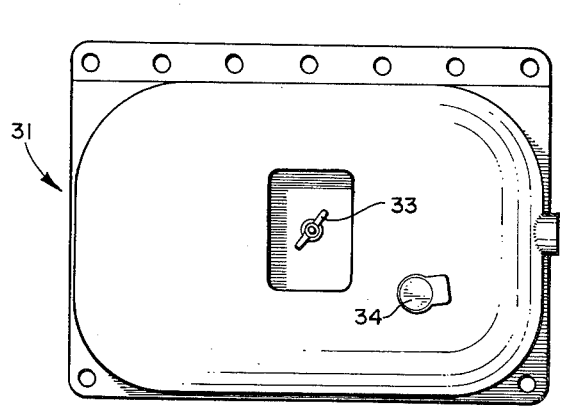
FIG. 2 is a top view of a water container.

With the control valve thus described the operation of the system can now be detailed. The supply sources include a water container 31 which as shown in FIG. 2 is adapted to be bolted to the firewall of the engine on one side and fit over the top of the air filter 32 so as to be attached thereto by wing nut 33 at the top of the filter. The other side of the water container is attached to support means extending from the fender or some other part of the frame. The water container 31 contains a vented filler cap 34 on top and a water supply tube 35 on the bottom. The water container may be constructed of any durable material such as polypropylene, polyethylene, polyvinyl chloride or any similar material.

Figure 3:
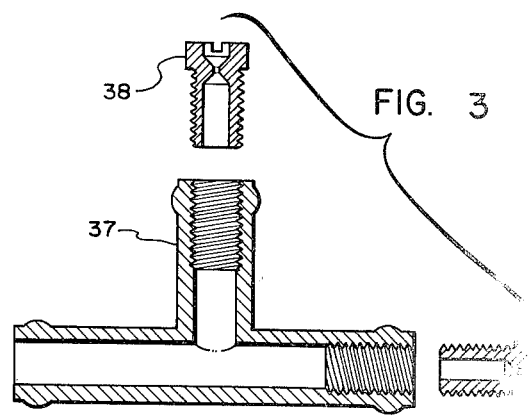
FIG. 3 is an exploded view of an air-water metering device.

An air bleed tube 36 extends from air filter 32 to the metering assembly 37 as shown in detail in FIG. 3. Preferably the metering assembly 37 is a T shape having an air bleed orifice 38 of predetermined dimensions between aoubt 1/16 and 3/32 of an inch feeding into an air plenum leading into the main assembly 37. Likewise the assembly contains a water orifice 39 having a dimension of between about 0.014 and 0.022 of an inch. The air and water passing through the orifice are drawn in responsive to intake manifold vacuum allowed to pass through control valve 10. Because of the reduction of vacuum in the metering assembly 37 carried by the relatively large air bleed orifice a larger orifice 39 may be used for a given amount of water. This minimizes the clogging of the water orifice due to particles of solids and reduces any filtering demand on the water inlet filter.

The air water mixture in metering assembly 37 is responsive to the intake manifold vacuum as exerted on line 40 through control valve 10, heater line 41, heater 42 and inlet line 43.

The heater 42 is shown in FIGS. 7 and 8 as being in the shape of a half cylinder and as such is bolted to the exhaust manifold where, through heat exchange, the water vapor is instantly flashed into minute water mist like particles. A specific advantage of the air metered into the metering assembly 37 is that the water vapor is carried through the system uniformly preventing the pooling of water, especially in the heater, which could cause surges of steam and water to enter the intake manifold and engine cylinders. As a result of the air bleed the system becomes a dry system thus preventing freeze damage during cold weather. The air bleed also provides air to the heater 42 to act as a heat transfer agent between the heater walls and water particles improving efficiency of operation.

Heater 42 consists of a hollow body portion 44 having an inlet part 45 and an outlet part 46. Because of the flashing of water vapor in heater body 43 the outlet part 45 will necessarily be larger than the inlet part 44. The heater need not be fastened directly to the exhaust manifold to provide heat exchange. Various designs utilizing the exhaust pipe as the heat exchange means could also be utilized. Of course, the closer the heater is to the exhaust manifold the greater the heat exchange will be.

The hot water vapor is injected into the fuel system at any position between the throttle and the beginning of the intake manifold.

The actuating source for the control valve can be any carburetor vacuum line preferably above the throttle valve, but as shown in older cars, may actually be below the throttle valve. For purposes of illustration the vacuum spark advance tube will be used. An actuation line 48 leading to the control valve inlet port 11 supplies the necessary vacuum to operate the control valve 10.

FIG. 9 graphically shows the vacuum exerted by a typical vacuum spark advance tube at various throttle openings. Whereas FIG. 10 shows the typical intake manifold vacuum as compared with engine RPM at various throttle openings.

From FIG. 4 it is evident that maximum flow through control valve 10 occur when the valve needle is only partially open. In other words when the engine is accelerating or operating at full throttle the vacuum spark advance vacuum is not at a maximum and by choosing the correct tension on spring 21 and by adjustment of nut 17 the diaphragm 13 will only partially open the valve needle 15 allowing maximum air water flow. At idle engine speeds the vacuum zeros out and the throttle remains closed creating a relatively high intake manifold vacuum. As the throttle opens the intake manifold vacuum varies roughly according to the engine RPM but the vacuum remains sufficient to allow the air water flow through control valve 10. At cruising speed the vacuum spark advance vacuum reaches a maximum thereby causing diaphragm 13 to pull control needle 15 forward a maximum distance. The result is that the valve tail 28 enters aperture 26 restricting air water flow to heater 42 because less water is required at cruising speeds and deceleration than during acceleration.

Because of the interaction of the various portions of the system the moisturized air entering the intake manifold from inlet line 43 makes essentially a dry system.

While not wishing to be confined to any particular theory as to why the system provides greater efficiency, including lower emissions and greater gas mileage the following explanation is offered. Most automobile engine carburetors are designed to provide an air fuel ratio dependent upon the operating conditions such as (1) engine idle conditions, (2) engine acceleration conditions providing high torque at low RPM and (3) engine cruise conditions designed for increased economy.

Normal combustion requires about 15.1 pounds of dry air to completely burn 1 pound of gasoline. Thus the air to fuel ratio is 15.1 to 1.

Idle conditions are different. The air fuel mixture or ratio is relatively low, e.g. from about 10:1 to 12:1. When accelerating with high torque at low engine RPM, i.e. high start up and acceleration, the air to fuel ratio is usually in the range of 13:1 to 15:1. Under cruise conditions where maximum power is not required the air to fuel ratio is higher being in the realm of 15:1 to 18:1.

While running under the above conditions the phenomenon can be noticed, that engines run better under high humidity conditions, e.g. better acceleration response, less knocking or pinging, less tendency for the engine to diesel or continue running after the ignition has been turned off, and cooler running of the engine.

It is believed that there are two primary reasons for the increased advantages both of which require an air bleed as well as water injection into the metering device. Water and water vapor have relatively high specific heats. Water vapor exhibits a very high pressure increase with only a nominal increase in temperature. For example confined water vapor at 705° F. will exhibit a pressure of 3192 psig.

Combustion temperatures in the automobile engine reach temperatures in the order of 4000° F. The partial pressure of a small amount of water vapor rises to very high pressure under this temperature. The high specific heat of water vapor in turn tends to keep the peak temperatures in the combustion chamber down. This accounts for more power, less knocking or pinging and less tendency to develop hot spots and diesel. A cleaner smoother running engine is the result wherein the burning of the fuel mixture is uniform providing a smooth power stroke to the piston rather than an explosion.

According to Dalton's Law of partial pressure the total pressure of a mixture of gasses is the sum of the pressures exhibited by each gas separately were it to occupy the vessel alone. Water vapor at atmospheric or any other low pressure can be considered to be a gas.

Under high humidity conditions the air drawn into the engine is a mixture of dry air and water vapor. The carburetor cannot distinguish the difference and therefore feeds a set amount of fuel into the stream of air and water vapor. The result is that the engine is burning a richer mixture of true dry air to fuel than is anticipated. As previously stated this lower ratio is approaching that required for acceleration, therefore ignoring the compensating positive factors of the water vapor, the air to fuel mixture becomes richer and therefore the engine has better acceleration response.

Under humid conditions or even with the addition of just water to the carburetor the mixture fed to the intake manifold is a mixture of dry air, fuel and water vapor. With a system introducing more water vapor the manifold mixture drawn into the combustion chamber is further diluted with the added water vapor. The air to fuel ratio is thus lowered. To compensate for this condition more air must be introduced into the intake manifold. The bleed air mixed with the water in the metering device serves to accomplish this.

There is a practical limit as to the amount of water vapor that can be introduced into the intake manifold and cylinders without quenching the flame in the combustion chamber causing loss of power, incomplete combustion and expelling partially burned hydrocarbons and carbon as black smoke from the exhaust. There is also a limit as to the amount of vaporized water and air that can be fed into the intake manifold as the pressure differential between the intake manifold and the outside atmosphere must be maintained to prevent loss of carburetor efficiency. Thus, the amount of bleed air that can be used is also limited.

If operated properly however, these limiting factors prove to be advantageous because the same power can be generated using less fuel at a proper air to fuel ratio. Since less dry air is admitted into the fuel system because of the use of water vapor and bled in air and since the carburetor cannot sense the difference between dry and humid air the compensating factor is to introduce less fuel by reducing the size of the power jets in the carburetor fuel feed system. The size of the reduction will of course, depend upon the carburetor used.

In general the weight ratio of water to fuel will vary from about 0.20:1 to 0.30:1 with the control valve 10 being set to deliver water in the minimum ratio so that extra water brought in because of high humidity will not exceed the water requirement.

Thus the control valve and the vacuum executed thereon, the manifold vacuum the size of the power jets in the carburetor and the air water metering assembly all interact to produce an efficient system having the above detailed advantages.

Although the invention as has been described is deemed to be that which would form the preferred embodiment of the invention, it is recognized that departures may be made therefrom without departing from the scope of the invention which is not to be limited to the details disclosed, but is to be accorded the full scope of the claims so as to include any and all equivalent devices and apparatus.

I claim:

1. A method of controlling the injection of a vaporized air water mixture into the fuel system of an internal combustion engine which comprises providing a vacuum responsive control valve which applies zero vacuum at engine idle speeds and wherein the control valve opens in response to engine RPM to allow the vaporized air water mixture to be drawn by vacuum from the intake manifold from an air bleed line and a water line through orifices into an air water metering assembly, from the metering assembly through the control valve to an exhaust heat exchange heater wherein the water in the air is instantly heated and further vaporized and passed from said heater into the air fuel mixture entering the intake manifold from the carburetor.

2. A method according to claim 1 wherein the orifices in the metering assembly are of a predetermined size.

3. A method according to claim 2 wherein the power jets of the carburetor are reduced in size from a comparable carburetor not being integrated with a vaporized air water injection system.

4. A method according to claim 3 wherein the control valve is so constructed that maximum vaporized air water mixture flows through the control valve in a partially open position.

5. A method according to claim 4 wherein maximum amounts of vaporized air water mixture are injected into the fuel system during periods of engine acceleration.

6. A method according to claim 1 wherein the air to fuel ratio entering the intake manifold of the engine is the same as in engines not containing a vaporized air water vapor mixture injected into the fuel system but wherein the amount of fuel injected is reduced to compensate for the injected water vapor so that the intake manifold vacuum maintains the desired pressure differential with the outside atmosphere.

7. A vaporized air water apparatus for injecting an air water vapor into the fuel system of an internal combustion engine which comprises a water source, an air source, means for leading the air and water from said sources through orifices into an air water metering device, a vacuum responsive control valve having zero vacuum at engine idle speeds which vacuum is increased with engine RPM, means to direct the vaporized air water mixture from the metering assembly through the control valve, when the control valve is open, to an exhaust heat exchange heater wherein the water is further vaporized and means to direct the heated vaporized air water mixture into the fuel system along with the air fuel mixture from the carburetor.

8. An apparatus according to claim 7 wherein the control valve is operated as a function of the vacuum developed in the carburetor above the throttle.

9. An apparatus according to claim 8 wherein the vaporized air-water mixture is introduced into the fuel system between the throttle and the beginning of the intake manifold.

10. An apparatus according to claim 8 wherein the power jet openings in the carburetor are reduced in size from a comparable carburetor not having a vaporized air water injection system.

* * * * *